D.C. TRANSFORMER FOR SUPERCONDUCTIVE CIRCUITRY

Filed Nov. 21, 1962

INVENTORS
RICHARD A. CONNELL
DANIEL J. QUINN III

BY George Baum
ATTORNEY

United States Patent Office 3,191,136

Patented June 22, 1965

3,191,136

D.C. TRANSFORMER FOR SUPERCONDUCTIVE CIRCUITRY

Richard A. Connell, Mount Kisco, and Daniel J. Quinn III, Chappaqua, N.Y., assignors to International Business Machines Corporation, New York, N.Y., a corporation of New York Filed Nov. 21, 1962, Ser. No. 239,247
5 Claims. (Cl. 336—84)

This invention relates to transformer coupling circuits, but more particularly to transformer circuits employable with superconducting circuits.

Superconductors have the capability of assuming a zero resistance state when kept at temperatures near absolute zero. Metals such as lead, tantalum and niobium, when cooled in a bath of liquid helium at 4.2° K., become superconducting. When a magnetic field of predetermined value or higher is applied to such superconductors, they are driven to their resistive states and show a resistance to the flow of current therethrough. A raising of the temperatures of metals above the 4.2° K. temperature will drive the metals to their resistive states.

It is also known that such superconductive elements are employed in superconductive circuits wherein the components are chosen because they can be made exceedingly small so that the density of packaging electrical components is very high. For example, gates and control lines employed in superconductive devices are vapor deposited into suitable substrates and are of the order of 50–10,000 angstroms thick and of the same order of width. These gates and control lines, in conjunction with other superconductive elements, form a film of logic solving and/or memory devices that are driven by energy-supplying bulk components lying outside the film. Means must be provided to couple such bulk means to such film. The present invention offers a simple, rugged and pluggable unit that permits such bulk elements to be electrically coupled to the thin film circuitry without relying on direct electrical contact between the two.

An object of this invention is to provide a rugged D.C. transformer especially adapted for use in cryogenic circuitry.

Another object is to provide a pluggable D.C. transformer that is compatible with the superconductive mircominiature modular packaging.

Yet another object is to provide a superconductive transformer that will provide large driving inductance so as to minimize current variations in superconductive paths driven by the output of said transformer.

The foregoing and other objects, features and advantages of the invention will be apparent from the following more particular description of a preferred embodiment of the invention, as illustrated in the accompanying drawings.

Figure 4:
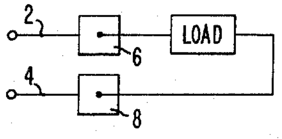
FIGURE 4 is a schematic representation of the manner in which the prior art makes contact between bulk components and a film of superconductive elements.

FIGURE 4 depicts the present mode of connecting bulk components, such as drive lines 2 and 4 to a superconductive film, represented by the block labelled "LOAD." Such block would comprise a supporting substrate of a few millimeters or less in thickness on which would be deposited, by vapor deposition techniques, many hundreds of superconductive elements that serve as gates, logical devices, decoders, memory elements and the like. At the periphery of such block would be a number of contacts or lands 6, 8, etc. to which drive lines or other lead lines would have to be soldered, fused, or otherwise joined to make electrical contact with such lands, 6, 8, etc. Not only is registry often difficult when many lands are involved, but the soldered joints may become severed at the temperatures near absolute zero at which the load and its soldered lands are maintained during normal operation of such superconductive circuits. It is also noted, that should relatively large currents be needed to drive the superconductive circuitry of the load, such currents would result in energy losses due to the joule heating generated in the normally resistive input-output leads.

Figure 5:
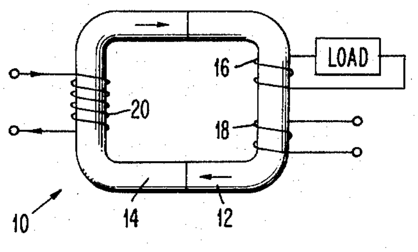
FIGURE 5 is a schematic representation of the manner in which the present invention makes electrical connection between bulk components and a film of superconductive elements.

FIGURE 5 represents schematically the mode of operation relied upon by the present invention. A split yoke 10 has two portions 12 and 14, portion 12 being embedded, in a manner to be described in greater detail hereinafter, in the same package that contains the thin film load circuitry L, and secondary windings 16, 18, etc. are deposited about said yoke portion 12.

Yoke portion 14 has a primary winding 20 wrapped about it, and yoke portion 14 is adapted, in a manner to be described hereinafter, to mate with yoke portion 12. Thus, when D.C. driving current is applied to primary winding 20, because of the difference in the turns ratio between primary winding 20 and the secondaries 16, 18, etc., high driving currents can be applied to the thin film circuitry L without concern about obtaining good soldered connections and the aforementioned heat losses due to joule heating in the input-output leads.

Figure 1:
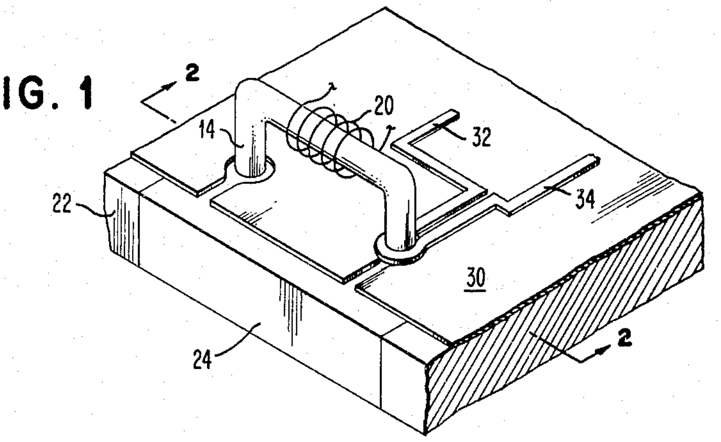
FIGURE 1 is a perspective view of a preferred embodiment of the invention.
Figure 2:
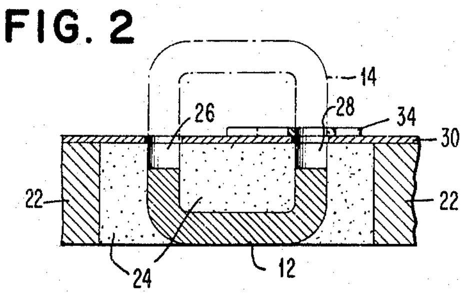
FIGURE 2 is a cross-section taken along line 2—2 of FIGURE 1 with a portion of the transformer omitted.
Figure 3:
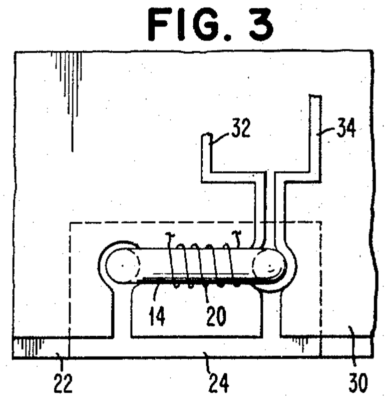
FIGURE 3 is a top view of FIGURE 1.

Turning to FIGURE 2, there is shown the manner in which the rugged superconductive transformer is built. A half-yoke 12 of ferromagnetic material is disposed within an opening in an electrically insulated substrate 22, aluminum being chosen merely as an illustration, and a molten material such as an epoxy resin 24 is poured into such opening so that yoke 12 and substrate 22 form a unitary structure. A suitable mold is employed during the pouring of the uncured or liquid epoxy resin so that two openings 26 and 28 remain, such openings serving to receive the other half-yoke 14 as shown in FIGURE 1.

A ground plane 30 is deposited onto the substrate 22 and epoxy resin 24, such ground plane being a common expedient in superconductive circuitry for concentrating magnetic fields associated with control lines 32 and 34 that lie on such ground plane 30. These control lines 32 and 34 are vacuum deposited through suitable masks so that portions of such control lines follow the contours of openings 26 and/or 28 and lie on the ground plane 30 very close to the respective rims of such openings. The half-yoke 14 of ferromagnetic material is inserted into openings 26 and 28 so that a close magnetic circuit is effected. A primary winding 20 is coiled about half-yoke 14, such winding being of a material having a high critical self current, or is a hard superconductor, such as niobium. A "hard" or "soft" superconductive material refers to relative conditions, the former term denoting a material which requires a magnetic field of relatively high intensity to drive it resistive at the operating temperature of the superconductive material, and the latter denoting a material requiring a magnetic field of much lower intensity to drive it resistive at the operating temperature. The manner in which variations in a D.C. current appearing in a transformer primarily are coupled to and are reflected in the output of the secondary of such transformer is set forth in U.S. Patent 2,987,631 which issued June 6, 1961. The present device presents a practical embodiment of a D.C. transformer for driving the control lines of a superconductive circuit.

It is seen that the present mode of construction permits one to attain a rugged, pluggable transformer suitable for modular construction of superconductive devices without the need to have physical contact between the thin film circuitry on a ground plane and the bulk components that must be electrically connected thereto. Moreover, the present device provides a means for obtaining large driving inductance so that changes in control current through lines 32 and 34 due to mutual coupling of such lines to gates or other drive lines (not shown) that make-up the film circuitry of load L will be minimized.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A D.C. transformer for use in superconductive circuitry comprising a first U-shaped, ferromagnetic, half-yoke having arm portions, said half-yoke encased in an electrically insulated block, openings in said block above the encased arm portions of said first half-yoke for accommodating arm portions of a second U-shaped half-yoke whereby the two half-yokes make contact and a closed magnetic path is produced, a superconductive shield disposed on said block and around said openings, electrically conductive elements deposited as thin film circuitry on said shield, portions of said thin film being deposited as loops about said openings so as to be magnetically coupled to said closed magnetic path.

2. A D.C. transformer for use in superconductive circuitry comprising a first U-shaped, ferromagnetic, half-yoke having arm portions, said half-yoke encased in an electrically insulated block, openings in said block above the encased arm portions of said first half-yoke for accommodating arm portions of a second U-shaped half-yoke whereby the two half-yokes make contact and a closed magnetic path is produced, a superconductive shield disposed on said block and around said openings, electrically conductive elements deposited as thin film circuitry on said shield, portions of said thin film being deposited as loops about said openings so as to be magnetically coupled to said closed magnetic path, and a primary winding on the removable half-yoke.

3. The transformer as defined in claim 2 wherein said primary winding is of a material that is a hard superconductor.

4. The transformer as defined in claim 2 wherein said primary winding is niobium.

5. A D.C. transformer for use in superconductive circuitry comprising a first U-shaped ferromagnetic half-yoke having arm portions, said half-yoke encased in an electrically insulated block, openings in said block above the encased arm portions of said first half-yoke for accommodating arm portions of a second U-shaped half-yoke whereby the two half-yokes make contact and a closed magnetic path is produced, a superconductive shield disposed on said block and around said openings, electrically conductive elements deposited as thin film circuitry on said shield, designated portions of said deposited thin film being employed as means for supplying driving currents to the remaining portions of said thin film circuitry, said designated portions being deposited as loops about said openings so as to be magnetically coupled to said closed magnetic path.

References Cited by the Examiner

UNITED STATES PATENTS

| | | | |
|---|---|---|---|
| 2,914,735 | 11/59 | Young | 340—173.1 X |
| 2,966,647 | 12/60 | Lentz | 307—88.5 X |
| 2,987,631 | 6/61 | Parl | 307—88.5 X |
| 3,007,057 | 10/61 | Brennemann et al. | 340—173.1 X |
| 3,086,130 | 4/63 | Meyers et al. | 340—173.1 X |
| 3,090,023 | 5/63 | Brennemann et al. | 340—174.1 X |

LARAMIE E. ASKIN, *Primary Examiner.*

JOHN F. BURNS, *Examiner.*